US012391609B2

(12) United States Patent
Lehuede et al.

(10) Patent No.: US 12,391,609 B2
(45) Date of Patent: *Aug. 19, 2025

(54) DECORATIVE POROUS INORGANIC LAYER COMPATIBLE WITH ION EXCHANGE PROCESSES

(71) Applicant: CORNING INCORPORATED, Corning, NY (US)

(72) Inventors: Philippe Lehuede, Dammarie-les-Lys (FR); Marie Jacqueline Monique Comte, Fontenay aux Roses (FR)

(73) Assignee: CORNING INCORPORATED, Corning, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/084,873

(22) Filed: Dec. 20, 2022

(65) Prior Publication Data

US 2023/0183129 A1     Jun. 15, 2023

Related U.S. Application Data

(63) Continuation of application No. 14/768,832, filed as application No. PCT/US2014/017911 on Feb. 24, 2014, now Pat. No. 11,554,986.

(Continued)

(51) Int. Cl.
    *C03C 21/00*       (2006.01)
    *C03C 3/04*        (2006.01)
    (Continued)

(52) U.S. Cl.
    CPC .............. *C03C 21/002* (2013.01); *C03C 3/04* (2013.01); *C03C 3/16* (2013.01); *C03C 3/17* (2013.01);
    (Continued)

(58) Field of Classification Search
None
See application file for complete search history.

(56) References Cited

U.S. PATENT DOCUMENTS 3,721,594 A     3/1973   Tarnopol et al.
3,723,080 A     3/1973   Howell et al.
(Continued)

FOREIGN PATENT DOCUMENTS

CA          2189380 A1 *   5/1997    ........ C03C 10/0027
CN        101885582 A     11/2010
(Continued)

OTHER PUBLICATIONS

Translation DE-19939737-A1; Paulus H; Feb. 2001 (Year: 2001).*
(Continued)

*Primary Examiner* — David Sample
(74) *Attorney, Agent, or Firm* — William M. Johnson; Payal A. Patel; Kevin M. Able

(57) ABSTRACT

Embodiments of methods for forming strengthened glass articles comprise providing an exchangeable glass substrate having a coefficient of thermal expansion (CTE) between about 60×10-7/° C. to about 110×10-7/° C., depositing at least one decorative porous inorganic layer onto at least a portion of the surface of the glass substrate, wherein the decorative porous inorganic layer comprises a glass transition temperature (Tg)≥450° C., a glass softening temperature (Ts)≤650° C., wherein the difference in CTE values between the glass substrate and the decorative porous inorganic layer is within 10×10-7/° C.; and curing the glass substrate and the deposited decorative porous inorganic layer at a temperature greater than the Ts of the decorative porous inorganic layer; and chemically strengthening the cured glass substrate and the decorative porous inorganic (Continued)

layer thereon via ion exchange at a temperature below the Tg of the decorative porous inorganic layer.

17 Claims, 2 Drawing Sheets

Related U.S. Application Data

(60) Provisional application No. 61/769,518, filed on Feb. 26, 2013.

(51) Int. Cl.

| | | |
|---|---|---|
| C03C 3/16 | (2006.01) | |
| C03C 3/17 | (2006.01) | |
| C03C 3/21 | (2006.01) | |
| C03C 4/18 | (2006.01) | |
| C03C 8/08 | (2006.01) | |
| C03C 8/14 | (2006.01) | |
| C03C 17/00 | (2006.01) | |
| C03C 17/04 | (2006.01) | |

(52) U.S. Cl.
CPC ............... *C03C 3/21* (2013.01); *C03C 4/18* (2013.01); *C03C 8/08* (2013.01); *C03C 8/14* (2013.01); *C03C 17/007* (2013.01); *C03C 17/04* (2013.01); *C03C 2204/00* (2013.01); *C03C 2207/00* (2013.01); *C03C 2217/23* (2013.01); *C03C 2217/425* (2013.01); *C03C 2217/72* (2013.01)

(56) References Cited

U.S. PATENT DOCUMENTS

| | | | |
|---|---|---|---|
| 3,773,489 A | 11/1973 | Forker et al. | |
| 4,080,694 A | 3/1978 | Moore et al. | |
| 4,874,414 A | 10/1989 | Kaite et al. | |
| 5,215,563 A | 6/1993 | Lacourse et al. | |
| 5,250,321 A | 10/1993 | Andersson et al. | |
| 5,451,180 A | 9/1995 | Chan et al. | |
| 5,451,280 A | 9/1995 | Gillner | |
| 5,710,081 A | 1/1998 | Tunker | |
| 6,566,810 B1 | 5/2003 | Seibold et al. | |
| 6,624,104 B2 | 9/2003 | Sakoske et al. | |
| 6,733,850 B1 | 5/2004 | Domi et al. | |
| 6,998,776 B2 | 2/2006 | Aitken et al. | |
| 7,407,423 B2 | 8/2008 | Aitken et al. | |
| 8,063,560 B2 | 11/2011 | Aitken et al. | |
| 8,591,278 B1 | 11/2013 | Woo et al. | |
| 9,212,084 B2 | 12/2015 | Wang et al. | |
| 9,487,439 B2* | 11/2016 | Axtell, III | C03C 21/002 |
| 2001/0010649 A1 | 8/2001 | Lu | |
| 2001/0049327 A1 | 12/2001 | Hachitani | |
| 2002/0116949 A1 | 8/2002 | Furui et al. | |
| 2003/0214623 A1 | 11/2003 | Ebisu et al. | |
| 2006/0128549 A1 | 6/2006 | Hormadaly | |
| 2006/0154085 A1 | 7/2006 | Cleary | |
| 2006/0154799 A1 | 7/2006 | Rehorek et al. | |
| 2006/0233082 A1 | 10/2006 | Lee et al. | |
| 2008/0044488 A1 | 2/2008 | Zimmer et al. | |
| 2009/0011915 A1 | 1/2009 | Drake et al. | |
| 2009/0069164 A1 | 3/2009 | Lamberson et al. | |
| 2009/0130395 A1 | 5/2009 | Lyon et al. | |
| 2009/0151854 A1 | 6/2009 | Cooper | |
| 2009/0233082 A1 | 9/2009 | Esemann et al. | |
| 2009/0247385 A1 | 10/2009 | Ide | |
| 2009/0297862 A1 | 12/2009 | Boek et al. | |
| 2010/0095705 A1 | 4/2010 | Burkhalter et al. | |
| 2010/0304513 A1 | 12/2010 | Nguyen et al. | |
| 2011/0014475 A1 | 1/2011 | Murata | |
| 2011/0045961 A1 | 2/2011 | Dejneka et al. | |
| 2011/0091668 A1 | 4/2011 | Lamberson et al. | |
| 2011/0183118 A1 | 7/2011 | Lamberson et al. | |
| 2012/0009154 A1 | 1/2012 | Porubcan et al. | |
| 2012/0196126 A1* | 8/2012 | Axtell, III | C03C 8/18 |
| | | | 524/413 |
| 2012/0198888 A1 | 8/2012 | Hasegawa et al. | |
| 2012/0210750 A1 | 8/2012 | Cooper et al. | |
| 2012/0213951 A1 | 8/2012 | Dennis | |
| 2012/0282407 A1 | 11/2012 | Singh et al. | |
| 2013/0295353 A1 | 11/2013 | Drake et al. | |
| 2017/0047542 A1 | 2/2017 | Dejneka et al. | |

FOREIGN PATENT DOCUMENTS

| | | | |
|---|---|---|---|
| DE | 19939737 A1 * | 2/2001 | ............... B44C 1/17 |
| EP | 0625422 A1 | 11/1994 | |
| EP | 2423172 A1 | 2/2012 | |
| GB | 2079119 A | 2/1982 | |
| JP | 58-151476 A | 9/1983 | |
| JP | 61-151043 A | 7/1986 | |
| JP | 2002-234754 A | 8/2002 | |
| JP | 2003-095699 A | 4/2003 | |
| JP | 2010-120823 A | 6/2010 | |
| JP | 2010-235409 A | 10/2010 | |
| KR | 10-0768093 B1 | 10/2007 | |
| WO | 93/22250 A1 | 11/1993 | |
| WO | 2008/130747 A1 | 10/2008 | |
| WO | 2010/113838 A1 | 10/2010 | |

OTHER PUBLICATIONS

"Particle Size Conversion Table." sigmaaldrich.com. Web. Aug. 29, 2016.

Tsuchiya et al., "Correlation of Electrical Properties and Internal Friction in Mixed Conduction Glasses Containing Ionic and Electronic Conduction(1) FE2O3-NA2O-P2O5 Glasses", Journal of Materials Science, Kluwer Academic Publishers, Dordrecht, vol. 24, No. 2, 1989, pp. 493-499.

\* cited by examiner

DECORATIVE POROUS INORGANIC LAYER COMPATIBLE WITH ION EXCHANGE PROCESSES

CROSS REFERENCE TO RELATED APPLICATIONS

This application is a continuation of U.S. application Ser. No. 14/768,832 filed on Aug. 19, 2015, which in turn, claims the benefit of priority of International Application No. PCT/US14/17911 filed Feb. 24, 2014, which claims the benefit of priority under 35 U.S.C. § 119 of U.S. Provisional Application No. 61/769,518 filed on Feb. 26, 2013, the contents of each of which are relied upon and incorporated herein by reference in their entireties.

TECHNICAL FIELD

The present specification generally relates to strengthened glass articles and, more specifically, to strengthened glass articles comprising glass substrates with decorative porous inorganic layers compatible with ion exchange chemical strengthening.

SUMMARY

Ion exchange strengthening is used to improve the mechanical resistance of glass in numerous applications ranging from hand-held consumer smart-phones and electronic tablets to automotive glazing. Ion exchange strengthening is of particular interest in automotive glazing. Conventional automotive glazing is typically formed from soda-lime silica glass that has been thermally tempered to induce a surface compressive stress and improve the resistance of the glazing to mechanical failure following damage such as scratches, chips or the like. However, the amount of residual compressive stress imparted by thermal tempering is not high (on the order of 200 MPa-300 MPa). Accordingly, automotive glazing needs to be relatively thick to assure that the glazing will withstand high mechanical loads before failure occurs. Often, automotive glazing glass may have a thickness of about 7 mm.

Ion exchange processes generally impart a greater amount of compressive stress (typically on the order of 600 MPa to 1200 MPa) to glass articles compared to thermal tempering processes; therefore, ion exchanged glass articles generally have a greater resistance to mechanical failure than similar glass articles which are thermally tempered. This means that the ion exchanged glass articles may be formed with a reduced thickness while still retaining the same or even improved resistance to mechanical failure relative to thermally tempered glass articles. There is a continual need in the automotive glazing glass industry to decrease the weight of the glasses by reducing the thickness of the products.

Thus, there is a further challenge when strengthening glass products having decorative glass frit layers thereon, which is commonplace in automotive glazing glass; however, commercial inorganic decorative frits are generally unusable with such strengthening processes. For conventional frits, no ion exchange could be achieved under the decorative glass frit layer. Moreover, compressive stresses would be released if the decoration happened after the ion exchange due to the softening temperature of the frits higher than the exchange temperature.

Accordingly, the present disclosure is directed to a decorative porous inorganic frit layer which is compatible with and permits the decoration of ion exchangeable glasses before ion exchange chemical strengthening processes. To achieve this compatibility, the CTE (Coefficient of Thermal Expansion) of the decorative porous inorganic frit layer has to match the CTE of the glass substrate to avoid breakage or warpage of the products and its Tg (glass transition temperature) has to be higher than the ion exchange temperature not to degrade the quality of the decoration during exchange. As used herein, "match" means that the decorative porous inorganic frit has a CTE within $10\times10^{-7}/°$ C., or $5\times10^{-7}/°$ C., or is the same as the CTE of the glass substrate. Additionally, the decorative porous inorganic frit layer is compatible with glass forming and bending processes in which the curing of the decorative layer (between 650° C.-750° C.) is done. Thus, its glass softening point (Ts) is below the temperature of these processes, or less than or equal to 650° C.

In one embodiment, a method for forming a strengthened glass article is provided. A method for forming a strengthened glass article, the method comprising providing an exchangeable glass substrate having a coefficient of thermal expansion (CTE) ranging between about $60\times10$-$7/°$ C. to about $110\times10$-$7/°$ C.; depositing at least one decorative porous inorganic layer onto at least a portion of the surface of the glass substrate, wherein the decorative porous inorganic layer comprises a glass transition temperature (Tg)≥450° C., a glass softening temperature (Ts)≤650° C., wherein the difference in CTE values between the glass substrate and the decorative porous inorganic layer is within $10\times10$-$7/°$ C.; curing the glass substrate and the deposited decorative porous inorganic layer at a temperature greater than the glass softening temperature (Ts) of the decorative porous inorganic layer; and chemically strengthening the cured glass substrate and the decorative porous inorganic layer thereon via ion exchange at a temperature below the glass transition temperature (Tg) of the decorative porous inorganic layer.

In another embodiment, a strengthened glass article is provided. The strengthened glass article comprises a glass substrate having a coefficient of thermal expansion (CTE) ranging between about $80\times10$-$7/°$ C. to about $100\times10$-$7/°$ C.; and at least one decorative porous inorganic layer bonded onto at least a portion of the surface of the glass substrate, wherein the decorative porous inorganic layer comprises a glass transition temperature (Tg)≥450° C., a glass softening temperature (Ts)≤650° C., wherein the difference in CTE values between the glass substrate and the decorative porous inorganic layer is within $10\times10$-$7/°$ C., wherein the strengthened glass article comprises a compressive stress layer extending through the decorative glass frit layer and into the glass substrate, the compressive stress layer having a depth of layer DOL ≥30 μm and, and wherein the strengthened glass article comprises a flexural strength value defined by ring on ring testing (ROR)≥300 MPa.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the drawings enclosed herewith.

Figure 1A:
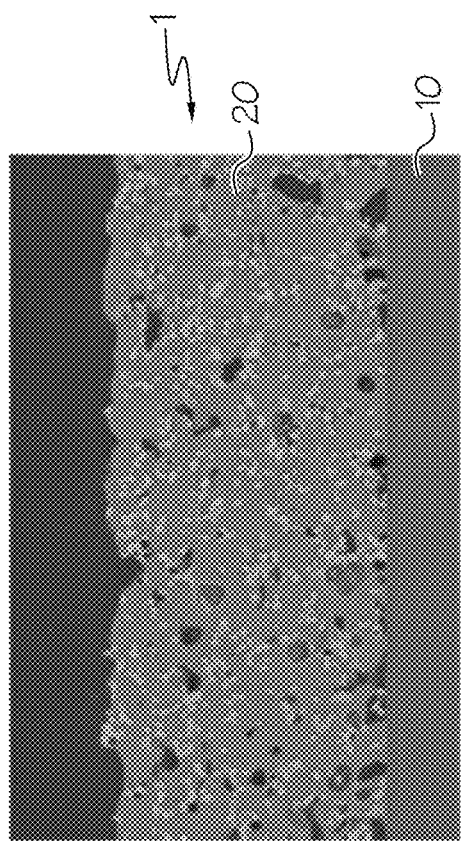
FIGS. 1A-1C are micrographs depicting strengthened glass articles with 0 wt % pigment (FIG. 1A), 21 wt % pigment (FIG. 1B), and 25 wt % pigment (FIG. 1C) according to one or more embodiments of the present disclosure.

The embodiments set forth in the drawings are illustrative in nature and not intended to be limiting of the invention defined by the claims. Moreover, individual features of the drawings will be more fully apparent and understood in view of the detailed description.

DETAILED DESCRIPTION

Embodiments of the present disclosure are directed to strengthened glass articles and methods of making strengthened glass articles. Referring to FIGS. 1A-1C and 2, the strengthened glass articles 1 may comprise glass substrates 10 with decorative porous inorganic layers 20 deposited thereon. As shown in FIG. 2 and described in detail below, the decorative porous inorganic layer 20 is compatible with ion exchange chemical strengthening, and allows the formation of a compressive stress layer 30 within the glass substrate 10.

The method for forming a strengthened glass article first comprises the steps of providing an ion exchangeable glass substrate. Generally, this substrate displays a CTE between $60 \times 10^{-7}$° C. to about $110 \times 10^{-7}$° C., or between $80 \times 10^{-7}$° C. to about $100 \times 10^{-7}$° C. Many glass substrate compositions are considered suitable. For example, the glass substrate may be an aluminosilicate glass or an aluminoborosilicate glass. One suitable commercial embodiment of the glass substrate is Gorilla® glass produced by Corning Inc. Exemplary Gorilla glass compositions are provided in US Publication No. 20110045961, which is assigned to Corning and is incorporated by reference herein in its entirety. Various thicknesses are contemplated for the glass substrate. For example, the glass substrate may include a thickness of from about 0.3 mm to about 4.0 mm, or from about 0.5 to about 2 mm, or from about 0.7 mm to about 1.5 mm.

Next, at least one decorative porous inorganic layer, also called the decorative layer, is deposited onto at least a portion of the surface of the glass substrate, wherein the decorative porous inorganic layer comprises a glass transition temperature (Tg)≥450° C., a glass softening temperature (Ts)≤650° C., and a coefficient of thermal expansion (CTE) difference with the substrate ≤$10 \times 10^{-7}$° C. Various deposition techniques are contemplated for the application of the decorative porous inorganic layer. In one exemplary embodiment, the decorative porous inorganic layer is deposited via screen printing.

Various processes are contemplated for achieving the inorganic glass frit composition. In one embodiment, the process may include mixing and melting the raw materials (or compositional components) at a temperature above 1000° C., or from about 1000° C. to about 1300° C. to form a glass. After the glass is obtained, it is grounded and sieved to produce an inorganic glass frit precursor. An alternative process consists of pouring the melted glass directly into water to facilitate further grinding. Optionally for deposition purposes, a rheology modifier or organic binder may be added to the porous inorganic glass frit powder to obtain an inorganic paste. Various compositions are contemplated as suitable for producing a paste from the porous inorganic glass frit powder. In one embodiment, the organic binder is pine oil, but other compositions are contemplated herein, for example, amyl acetate nitrocellulose.

The following exemplary process may be used to produce a decorative porous inorganic glass frit and deposit the decorative porous inorganic glass frit on a glass substrate. Melting may be performed in a heating vessel (e.g., silica crucible in a furnace) at a temperature between 1100° C. to 1250° C. Next, 250-350 g of raw materials may then be progressively introduced into the crucible. Fining may simultaneously be conducted at the same temperature during a time of 1 to 3 hours. To obtain small glass pieces and favor further grinding, the melted glass is directly poured into water and dried at about 120° C., and is then grounded and sieved into a powder. Organic binder, pine oil, may be added to the powder to make an inorganic paste, and then the paste may be deposited on Gorilla glass by a screen printing process. The deposited decorative layer may then be cured or baked in a furnace at temperatures above the glass softening temperature (Ts), for example, at a temperature of 650° C.-750° C. during 5 minute intervals with fast heating and cooling ramps between 21° C./minute and 45° C./minute. At which point, the decorative porous inorganic layer is adhered to the glass substrate. After curing, the thickness of the decorative layer may have a thickness between about 10 to 40 μm, or from about 20 to about 30 μm, or from about 20 to about 25 μm. As will be explained below, this curing step prior to chemical strengthening impacts the porosity of the decorative porous inorganic layer.

As stated above, the glass substrate has a CTE that matches (i.e., is within $10 \times 10^{-7}$/° C.) of the CTE of the decorative porous inorganic layer bonded thereto, because that ensures the requisite adhesion between the glass substrate and the decorative porous inorganic layer and may avoid warpage or breakage. Alternatively, the CTE of the glass substrate and the CTE of the deposited porous inorganic layer are within $5 \times 10^{-7}$/° C., or in some instances the respective CTEs may be substantially identical. In exemplary embodiments, the decorative porous inorganic layer may comprise a coefficient of thermal expansion (CTE) of about $60 \times 10^{-7}$° C. to about $110 \times 10^{-7}$° C., or about $80 \times 10^{-7}$° C. to about $100 \times 10^{-7}$° C.

Moreover, in specific embodiments, the decorative porous inorganic layer may comprise a glass softening temperature Ts from about 500 to about 650° C., or from about 525 to about 600° C. In further embodiments, the decorative porous inorganic layer may comprise a glass transition temperature Tg between 450° C. to about 500° C.

Various compositions are contemplated for achieving the combination of a Tg≥450° C., a Ts≤650° C., and a CTE from between about $60 \times 10^{-7}$/° C. to about $110 \times 10^{-7}$/° C. For example, the decorative porous inorganic layer comprises: from about 0 to about 10 mol % $Al_2O_3$; from about 0 to about 10 mol % CoO; from about 5 to about 25 mol % $Na_2O$; from about 0 to about 15 mol % $K_2O$; from about 0 to about 10 mol % $V_2O_5$; from about 0 to about 8 mol % $TiO_2$; from about 0 to about 15 mol % ZnO; from about 0 to about 10 mol % CaO; from about 20 to about 40 $Fe_2O_3$; and at least about 50 mol % $P_2O_5$.

In further embodiments, the decorative porous inorganic layer may comprise from about 8 to about 25 mol % $R_2O$, wherein $R_2O$ is $Na_2O$, $K_2O$, or both. In other alternative embodiments, the decorative porous inorganic layer may comprise from about 50 to about 60 mol % $P_2O_5$, and/or the decorative porous inorganic layer may comprise from about 22 to about 35 mol % $Fe_2O_3$. Further without being limited to theory, the CTE values may be controlled in part by selecting the right amount of $Fe_2O_3+Na_2O+K_2O$.

The above phosphate based compositions include glass frits with softening points lower than 650° C. Achieving a softening point lower than 650° C. may be more difficult with silicate based glass frits, thus some embodiments of the present porous inorganic glass layer may be silica free. That being said, it is contemplated that some decorative porous inorganic layer embodiments may include silica and still achieve a softening point below 650° C., thereby silica containing decorative porous inorganic layers are also contemplated as suitable.

When the glass substrate and the decorative porous inorganic layer is ion exchanged at a temperature above the glass transition Tg of the porous inorganic glass frit, the following mechanism occurs. Specifically, the alkali ions from the glass and the ion exchange bath must both diffuse through the decorative porous inorganic layer, thus the quality of the mechanical strengthening of the glass substrate depends at least in part on the level of porosity of the decorative layer. Without being bound by theory, the ion exchange bath generally contains ions with a larger size than most of the alkali ions of the glass to yield the desired chemical strengthening effect. For example, a glass containing mainly sodium ions may be exchanged in a bath containing potassium ions while a glass containing mainly lithium ions may be ion exchanged in a bath containing sodium ions. With insufficient porosity in the decorative porous inorganic layer, it may be difficult to obtain the ion exchange through the decorative porous inorganic layer necessary to chemically strengthen the glass substrate.

Once the processing steps have been performed and the strengthened glass articles have been produced, the strengthened glass article may have a thickness of between about 0.5 mm to about 5 mm, or a thickness of between about 1 to about 3 mm. Other thicknesses are also contemplated.

While various ion exchange parameters may be adjusted, the present ion exchange processes are selected to achieve a depth of layer (DOL) greater than or equal to about 30 μm below the decoration. For example, the ion exchange process may be conducted at a temperature of about 390° C. to about 500° C., or about 410° C. to about 450° C. for about 5 to about 15 hours. In specific embodiments, ROR values ≥400 MPa and/or a DOL greater than or equal to about 50 μm may be achieved.

As stated above, the porosity of the decorative porous inorganic layer ensures proper ion exchange to strengthen the glass substrate. Specifically, during ion exchange, the porosity of the decorative porous inorganic layer must be sufficient to permit the diffusion through the decorative porous inorganic layer of ions from the ion exchange bath and ions from the glass substrate.

Porosity may be impacted by various process factors. For example, the present inventors found that the decorative inorganic glass frit compositions impacts the porosity. In specific embodiments, selected compositions comprising $Na_2O$, $Fe_2O_3$, and $P_2O_5$ may contribute to desired porosity levels. Furthermore, varying ratios of $Na_2O/Fe_2O_3$ may yield several levels of porosity. Without being bound by theory, the selected ratios of $Na_2O/Fe_2O_3$ may impact the porosity necessary to achieve the desired ion exchange compatibility. For example, the ratio by mol % of $Na_2O/Fe_2O_3$ is from about 0.2 to about 1, or from about 0.3 to about 0.8. Without being bond by theory, it has been observed that glass frits with compositions comprising $Na_2O$, $Fe_2O_3$ and $P_2O_5$ tend to crystallize after curing and this crystallization could influence the final porosity of the layer.

Glass frit particle size may in part dictate the porosity of the porous inorganic glass frit. During the curing of the porous inorganic glass frit to the glass substrate prior to ion exchange, it was found that particle size greatly affected the developed porosity. For example, for the above exemplary phosphate frit compositions, which are crystallizing glass frits, porosity increases with the increase of the particle size. These frits have a particle size diameter of about 50 μm and below, and optionally a median particle size diameter (d50)≤15 μm. Moreover, these crystallizing glass frit particles may define a particle size diameter wherein at least 90% of the particles have a diameter (d90)≤40 μm. Other particle sizes are contemplated herein; however, larger particle sizes for the crystallizing glass frits may make it difficult to obtain a decorative glass frit layer with a good scratch resistance or a thickness around 20-30 μm which is the desired thickness for the auto glazing applications described herein. Alternatively, non-crystallizing frits may have a larger particle size, for example, a particle size of about 125 μm and below.

In a further embodiment, the decorative porous inorganic layer may comprise pigments, which may also increase the porosity of the decorative porous inorganic layer. Various pigments are contemplated depending on the application and the color of the decorative layer. For example and not by way of limitation, the following table (Table 1) lists desired pigment colors and suitable commercial pigments that may achieve these pigment colors. Several of the examples that follow below utilize copper chromite black spinel pigments, but that is not the only suitable pigment.

TABLE 1

| Desired Pigment Color | Suitable Pigments |
|---|---|
| Black | CuCrFe, CrFe, manganese ferrite spinel, FeCrCoNi |
| Blue | Cobalt aluminate, cobalt chromite spinel, CoZnCrAl |
| Green | Cobalt titanate green spinel |
| Brown | Manganese antimony titanium buff rutile, zinc iron chromite brown spinel, iron titanium brown spinel |
| Orange | Rutile tin zinc |
| Violet | Cobalt phosphate |
| Yellow | Nickel antimony titanium yellow rutile, niobium sulfur tin zinc oxide |
| Metallic aspect | Mica flakes covered with titanate or titanate + tin oxide or iron oxide |

Various amounts of pigments are contemplated based on the desired color, desired opacity and desired application. For example, the decorative porous inorganic layer may comprise about 10 to about 60 weight % of pigment, or from about 15 to about 30 weight % of pigment, or from about 20 to about 25 weight % of pigment.

Without being bound by theory, utilizing a decorative porous inorganic layer which is compatible with ion exchange may yield increased strength in the strengthened glass article with the decorative layer. Here, the strengthened glass article may comprise a flexural strength defined by ring on ring testing (ROR)≥300 MPa, or an ROR value ≥400 MPa. The ROR tests are performed on non-abraded samples and then a Weibull statistical analysis is performed on the ROR measurements to obtain the ROR values. In another exemplary embodiment, the strengthened glass article may comprise an ROR value between about 350 to about 500 MPa.

In addition to the strengthening improvements described above, for automotive glazing applications (e.g., sunroofs and windshields), applying the decorative porous inorganic layer prior to ion exchange may yield other advantages as compared to a post-ion exchange decoration processes. For example, production costs are lowered for the present process, because there is no additional process step to cure the decorative layer. Another advantage is that the present process allows a simple standard screen printing decoration process on flat glass as well as more complicated 3D shape samples. To further illustrate the advantages of the present disclosure, the following examples are provided.

Example 1: Compositional Examples

The following examples (Examples 1-16) provided in Tables 2 and 3 are exemplary inorganic crystallizing glass frits having a glass transition temperatures (Tg)≥450° C., a glass softening temperature (Ts)≤650° C., and a coefficient of thermal expansion (CTE) within 10×10-7/° C. of the glass substrate in accordance with one or more embodiments of the present disclosure. Table 4 lists specific properties for Examples 3, 7, and 16.

All of the compositions listed in Tables 3 and 4 were prepared as follows. The compositions were melted into a Silica crucible between 1150 to 1200° C. during 1 to 3 h, then directly poured into water. For Examples 3, 7, and 16, molten glasses were poured on a heating table in order to obtain 1 piece of glass allowing the characterization of their physical properties (and shown in Table 4). Drying, grinding and sieving were performed to obtain, finally, a frit powder with a medium particle size diameter, d50, between 1.5 μm to 12 μm.

Screen printing process was used to deposit the inorganic decorative layers on the surface of 1 mm thick Gorilla samples. For that, a paste containing 35-45 wt % pin oil and 55-65 wt % frit powder, was initially prepared. The size of the Gorilla substrates was 150×150 mm and the size of the decorated area was 100×100 mm. After screen printing, the decorated samples were dried at 120° C. for 30 minutes to eliminate the organic binder, then, cured at 650° C. or 700° C. with the following thermal cycle: heating ramp for 30 minutes from room temperature to set point temperature; maintain for 5 min; and then rapid cooling to room temperature. At the end, a good adhesion of the porous inorganic decorative layer on Gorilla substrate was obtained. The typical thickness of these porous inorganic decorative layers was between 10 to 40 μm.

TABLE 2

(Examples 1-8)

| Mole % | Ex. 1 | Ex. 2 | Ex. 3 | Ex. 4 | Ex. 5 | Ex. 6 | Ex. 7 | Ex. 8 |
|---|---|---|---|---|---|---|---|---|
| $Al_2O_3$ | | | | | | 5.0 | 7.5 | |
| CoO | | | | | | | | 2.0 |
| $Na_2O$ | 8.0 | 10.5 | 13.0 | 18.0 | 23.0 | 13.0 | 13.0 | 13.0 |
| $K_2O$ | | | | | | | | |
| $V_2O_5$ | | | | | | | | |
| $Fe_2O_3$ | 35.0 | 32.5 | 30.0 | 25.0 | 23.0 | 25.0 | 22.5 | 28.0 |
| $P_2O_5$ | 57.0 | 57.0 | 57.0 | 57.0 | 54.0 | 57.0 | 57.0 | 57.0 |

TABLE 3

(Examples 9-16)

| Mole % | Ex. 9 | Ex. 10 | Ex. 11 | Ex. 12 | Ex. 13 | Ex. 14 | Ex. 15 | Ex. 16 |
|---|---|---|---|---|---|---|---|---|
| $Al_2O_3$ | | | 5.0 | 5.0 | 7.5 | | | |
| $TiO_2$ | | | | | | | | 5.0 |
| CoO | 4.0 | 8.0 | 2.0 | 4.0 | 2.0 | | | |
| $Na_2O$ | 13.0 | 13.0 | 13.0 | 13.0 | 13.0 | 13.0 | | 13.0 |
| $K_2O$ | | | | | | | 13.0 | |
| $V_2O_5$ | | | | | | 4.0 | | |
| $Fe_2O_3$ | 26.0 | 23.0 | 24.0 | 22.5 | 22.0 | 26.0 | 30.0 | 25.0 |
| $P_2O_5$ | 57.0 | 56.0 | 56.0 | 55.5 | 55.5 | 57.0 | 57.0 | 57.0 |

TABLE 4

Physical Properties

| Physical Properties | Example 3 | Example 7 | Example 16 |
|---|---|---|---|
| Ts (° C.) | 547 | 535 | 560 |
| Tg (° C.) | 467 | 452 | 471 |
| CTE (×10$^{-7}$/° C.) of glass frit before curing | 89.3 | 96.6 | 91.4 |
| Warpage of the decorated samples after curing | No | No | No |

Example 2: Comparative Examples

Table 5 below lists several comparative examples of frit compositions which are not part of the present invention. Comparative Examples 1, 2 and 3 have softening points (Ts), which are too high i.e., above 650° C. Alternatively, Comparative Examples 4, 6, and 9 have CTE values which are too high, i.e., well above 110×10-7/° C. This yielded a strong mismatch between the CTE of the decorated layer after curing and the CTE of Gorilla glass. All these samples were broken after curing. Very bad qualities of the layers were obtained with Comparative Example 5. Wettability of the paste on the substrate after screen printing was very low and the roughness of the decorative layers after curing was very high. A melt could not be obtained from Comparative Example 7 and very fast devitrification occurred for Comparative Example 8. Thus, these 2 compositions could not be processed. Very bad stability of the decorative layer prior to curing was observed for Comparative Example 10. Specifically, the color of the layer rapidly changed from grey to pink.

The increase of the pigment content induces an increase of the porosity as shown in Table 7 below. The quantitative porosity level is an estimated value measured from SEM pictures (FIG. 1B and FIG. 1C) done on polished sections of the samples. The results (in %) are ratios between the pore surface and the total surface. These 2 surfaces are not measured only on 1 location of the layer but from several ones for a same sample.

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| $SiO_2$ |  | 47.5 | 47.5 |  |  |  |  |  |  |  |
| $Al_2O_3$ | 8.0 | 9.3 | 9.3 |  | 8.0 |  |  | 7.5 |  |  |
| $B_2O_3$ |  | 26.2 | 26.2 |  |  |  |  |  |  |  |
| $ZrO_2$ |  | 1.3 | 1.3 |  |  |  |  |  |  |  |
| $TiO_2$ |  |  |  |  |  | 10.0 | 15.0 |  |  |  |
| CoO |  |  |  |  |  |  |  |  |  | 30.0 |
| CaO |  |  |  |  |  | 15.0 |  |  |  |  |
| $Na_2O$ |  | 12.7 | 6.4 |  | 15.0 | 15.0 | 12.5 |  | 13.0 | 13.0 |
| $K_2O$ | 10.0 |  | 6.4 | 15.0 |  | 15.0 | 12.5 |  |  |  |
| ZnO |  |  |  | 20.0 | 10.0 |  |  | 50.1 |  |  |
| $WO_3$ | 20.0 |  |  |  |  |  |  |  |  |  |
| $Bi_2O_3$ |  |  |  | 15.0 | 7.0 |  |  |  |  |  |
| $Fe_2O_3$ |  |  |  |  |  |  |  |  |  |  |
| CuO |  |  |  |  |  |  |  |  | 30 |  |
| $P_2O_5$ | 62.0 |  |  | 50.0 | 60.0 | 45.0 | 60.0 | 42.5 | 57.0 | 57.0 |
| Ts (° C.) | 688 | 678 | 669 | 456 | N/A-poor | 448 | N/A-poor | N/A-poor |  | N/A-poor |
| Tg (° C.) | 497 | 522 | 500 | 374 | quality | 349 | quality | quality | 237 | quality |
| CTE | 85 | 64.9 | 69.6 | 140 |  | 173 |  |  | 131 |  |

Example 3: Porosity Studies

Utilizing the composition of Example 6, Table 6 below shows the effect that particle size has on the porosity of the decorative porous inorganic layer after curing via the function of the particle size at 50% (d50) and 90% (d90) of the total particle number. The porosity level of the layer is controlled visually with water deposited on top of the decoration. A qualitative value of porosity, inside a scale 0 to 5 and directly linked to the diffusion of the water inside the decoration, is defined as follows—0 meaning no porosity and 5 meaning very high porosity.

TABLE 6

| Effect of grounding process on Example 6 Composition | d50 (μm) Value | d90 (μm) Value | Porosity Level (0-5 scale) after curing |
|---|---|---|---|
| Ultra thin grounding | 1.61 | 3.42 | 0-1 |
| <50 μm | 12 | 37.52 | 4 |
| <125 μm | 42.5 | 101.8 | >5 |

Figure 1B:
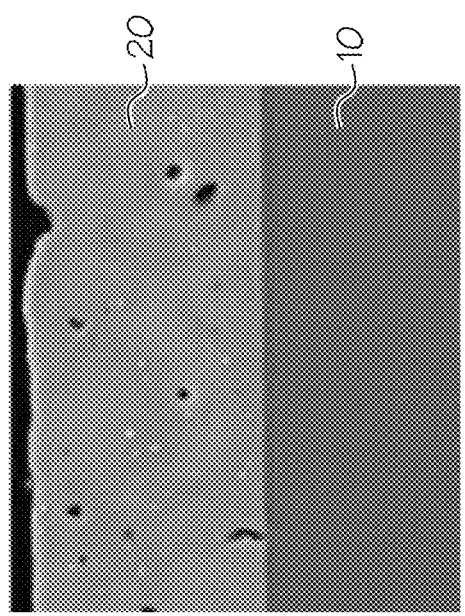
Figure 1C:
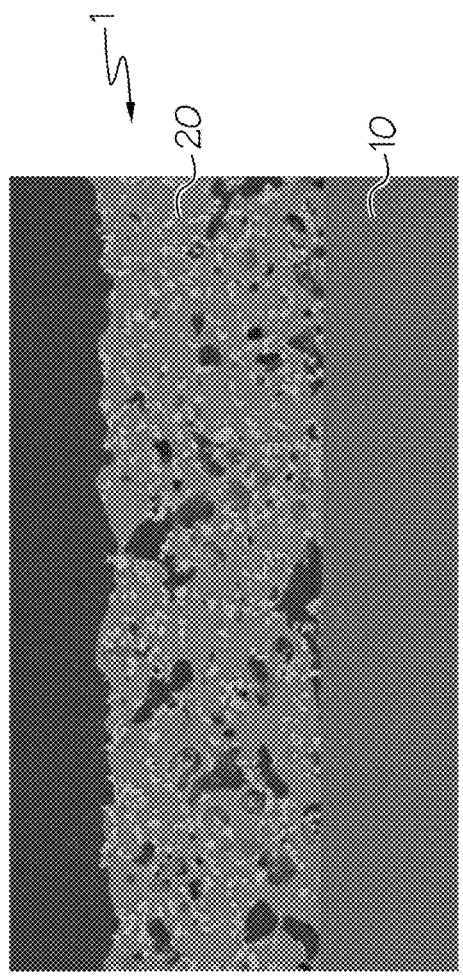
Figure 2:
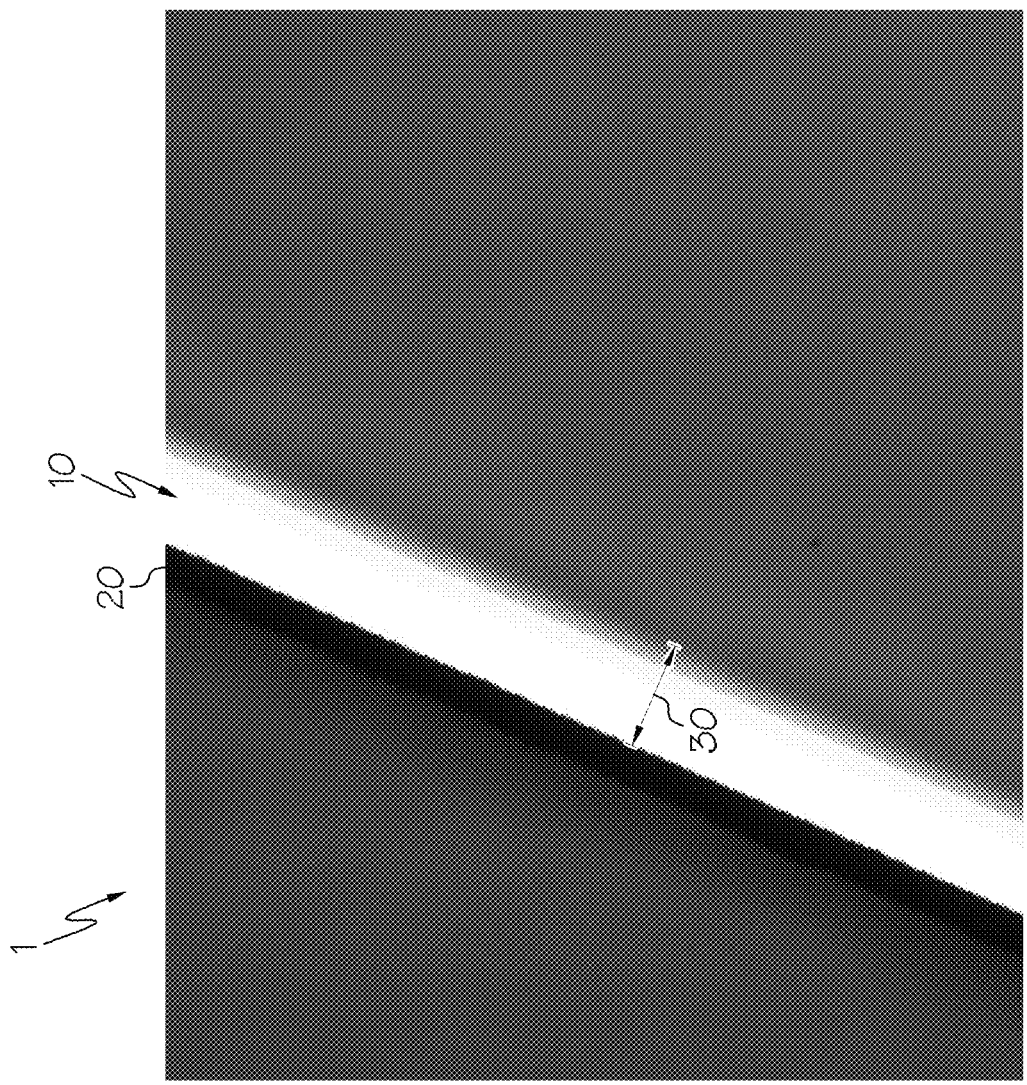
FIG. 2 is a cross-sectional micrograph depicting a strengthened decorated glass article according to one or more embodiments of the present disclosure.

By adding copper chromite black spinel pigments, the scanning electron microscope (SEM) micrographs of FIGS. 1A, 1B and 1C show the evolution of the porosity of the layer after curing when 21 and 25 weight % of pigment is added to Example 6 with d90=3.42 μm. In this Example, the thickness of the porous inorganic frit layer is around 20 μm.

TABLE 7

| % Pigment in Sample | Qualitative Porosity Level (obtained via visual inspection) | Quantitative Porosity Level |
|---|---|---|
| 0 wt % pigment | 0-1 | Not measured |
| 21 wt % pigment | 4 | 16% |
| 25 wt % pigment | 5 | 22% |

Example 4: Ring on Ring Testing

Table 8 below depicts several decorated samples with different porosity levels that have been ion exchanged and characterized in mechanical resistance. As shown, the ROR (Ring On Ring) flexural strength values are linked to the porosity of the decorative porous inorganic layer. Moreover, ROR values higher than 400 MPa were obtained for highly porous decorative glass frit layers, all of which having a good adhesion on Gorilla glass. These ROR values were obtained by utilizing ring on ring measurements of non-abraded samples and a subsequent Weibull analysis.

TABLE 8

| Sample | Porosity Level After Curing | Ion Exchange Process Parameters | Ring On Ring Flexural Strength (Weibull Values - MPa) |
|---|---|---|---|
| Example 7 | 0-1 | 430° C. for 15 hours | 76 |
| Example 8 + 7.5% pigment | 2 |  | 177 |
| Example 12 + 25% pigment | 4-4.5 | 475° C. for 5 hours | 385 |

TABLE 8-continued

| Sample | Porosity Level After Curing | Ion Exchange Process Parameters | Ring On Ring Flexural Strength (Weibull Values - MPa) |
|---|---|---|---|
| Example 6 + 25% pigment | 5 (22% via SEM analysis) | 430° C. for 15 hours | 478 |
| | 5 | 475° C. for 5 hours | 437 |

FIG. 2 shows the compressive strength developed into the Gorilla glass under the decoration after ion exchange at 430° C. for 15 hours on above sample "Example 6+25% pigment". This picture was taken on a thin slice of the sample with a polarizing microscope. The thickness of the decorative layer is around 20 μm and the DOL (Depth of Layer) of the compressive zone is around 54 μm compared to 60-62 μm for the opposite side (non-decorated one).

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A glass article comprising:
   a glass substrate comprising a surface; and
   a porous inorganic layer disposed on the surface, wherein:
   the porous inorganic layer comprises a thickness that is greater than or equal to 10 μm and less than or equal to 40 μm and is less than a thickness of the glass substrate,
   thicknesses of the porous inorganic layer and the glass substrate are measured in the same direction,
   the porous inorganic layer comprises a glass frit matrix, and
   the glass frit matrix comprises a composition comprising:
   from about 0 to about 10 mol % $Al_2O_3$;
   from about 0 to about 10 mol % CoO;
   from about 5 to about 25 mol % $Na_2O$;
   from about 0 to about 15 mol % $K_2O$;
   from about 0 to about 10 mol % $V_2O_5$;
   from about 0 to about 8 mol % $TiO_2$;
   from about 0 to about 15 mol % ZnO;
   from about 0 to about 10 mol % CaO;
   from about 20 to about 40 mol % $Fe_2O_3$; and
   at least about 50 mol % $P_2O_5$.

2. The glass article of claim 1, wherein the glass frit matrix is formed from a glass frit comprising a mean (d50) particle size that is less than or equal to 15 μm.

3. The glass article of claim 2, wherein the glass frit comprises a (d90) particle size that is less than or equal to 40 μm.

4. The glass article of claim 2, wherein the porous inorganic layer comprises from 14 to about 30 weight % of a pigment.

5. The glass article of claim 2, wherein the porous inorganic layer comprises from 16% to 22% porosity.

6. The glass article of claim 1, wherein the porous inorganic layer comprises a glass transition temperature (Tg)≥450° C. and a glass softening temperature (Ts)≤650° C.

7. The glass article of claim 6, wherein the porous inorganic layer comprises a coefficient of thermal expansion (CTE) of about $60\times10^{-7}$/° C. to about $110\times10^{-7}$/° C.

8. The glass article of claim 1, wherein the porous inorganic layer comprises from about 22 to about 35 mol % $Fe_2O_3$.

9. The glass article of claim 1, wherein the porous inorganic layer comprises a ratio of $Na_2O/Fe_2O_3$ from 0.3 to 0.8.

10. The glass article of claim 1, wherein the surface is a major surface of the glass substrate.

11. A glass article comprising:
    a glass substrate having a coefficient of thermal expansion (CTE) ranging between about $60\times10^{-7}$/° C. to about $110\times10^{-7}$/° C.; and
    at least one decorative porous inorganic layer bonded onto at least a portion of a surface of the glass substrate, wherein the at least one decorative porous inorganic layer comprises a crystallizing glass frit having a glass transition temperature (Tg)≥450° C., a glass softening temperature (Ts) ranging from 525° C. to 650° C., wherein the difference in CTE values between the glass substrate and the at least one decorative porous inorganic layer is within $10\times10^{-7}$/° C.;
    wherein the at least one decorative porous inorganic layer comprises:
    a d90 particle size diameter that is ≤40 μm;
    a d50 particle size diameter that is ≤15 μm;
    from about 0 to about 10 mol % $Al_2O_3$;
    from about 0 to about 10 mol % CoO;
    from about 5 to about 25 mol % $Na_2O$;
    from about 0 to about 15 mol % $K_2O$;
    from about 0 to about 10 mol % $V_2O_5$;
    from about 0 to about 8 mol % $TiO_2$;
    from about 0 to about 15 mol % ZnO;
    from about 0 to about 10 mol % CaO;
    from about 20 to about 40 mol % $Fe_2O_3$; and
    at least about 50 mol % $P_2O_5$.

12. The glass article of claim 11, wherein the at least one decorative porous inorganic layer comprises from 16% to 22% porosity.

13. The glass article of claim 11, wherein the at least one decorative porous inorganic layer comprises from 14 to about 30 weight % of a pigment.

14. The glass article of claim 11, wherein the at least one decorative porous inorganic layer comprises $Na_2O$ and $K_2O$ in a combined amount ranging from about 8 to about 25 mol %.

15. The glass article of claim 11, wherein the at least one decorative porous inorganic layer comprises from about 50 to about 60 mol % $P_2O_5$.

16. The glass article of claim 11, wherein the at least one decorative porous inorganic layer comprises a ratio of $Na_2O/Fe_2O_3$ from 0.3 to 0.8.

17. The glass article of claim 11, wherein the at least one decorative porous inorganic layer is silica free.

* * * * *